US009949595B1

(12) United States Patent
Greenwood (10) Patent No.: US 9,949,595 B1
(45) Date of Patent: Apr. 24, 2018

(54) COOKWARE RACK (71) Applicant: YouCopia Products Inc, Chicago, IL (US)

(72) Inventor: Mark Greenwood, Arlington Hts., IL (US)

(73) Assignee: YOUCOPIA PRODUCTS INC., Chicago, IL (US)

( * ) Notice: Subject to any disclaimer, the term of this patent is extended or adjusted under 35 U.S.C. 154(b) by 0 days.

(21) Appl. No.: 15/440,634

(22) Filed: Feb. 23, 2017

(51) Int. Cl.
A47J 47/16 (2006.01)
A47B 77/14 (2006.01)
A47J 36/34 (2006.01)

(52) U.S. Cl.
CPC .............. A47J 47/16 (2013.01); A47B 77/14 (2013.01); A47J 36/34 (2013.01)

(58) Field of Classification Search
CPC ........... A47J 47/16; A47J 36/34; A47B 77/14; A47B 57/58; B42F 17/12; Y10T 403/55; A61J 7/0481
USPC ...................................................... 211/41.2
See application file for complete search history.

(56) References Cited

U.S. PATENT DOCUMENTS

| 386,674 | A | * | 7/1888 | Wells | B42F 17/08 206/561 |
| 423,647 | A | * | 3/1890 | Wells | B42F 17/08 211/11 |
| 451,729 | A | * | 5/1891 | Dom | B42F 17/12 211/11 |
| 466,969 | A | * | 1/1892 | Wells | A61J 7/0481 312/234.1 |
| 2,062,802 | A | * | 12/1936 | Walker | A47F 7/175 211/11 |
| 2,160,050 | A | * | 5/1939 | Wolf | A47F 7/22 2/115 |
| 2,219,145 | A | * | 10/1940 | Wolf | A47F 7/22 2/115 |
| 3,269,547 | A | * | 8/1966 | Chamberlin | A47B 57/58 108/60 |
| 4,750,625 | A | * | 6/1988 | Frederick | A47B 96/02 108/157.13 |
| 6,116,436 | A | * | 9/2000 | Ferrucci | A47B 55/02 108/181 |
| 7,007,808 | B2 | * | 3/2006 | Morgan | A47J 47/16 211/41.11 |

* cited by examiner

Primary Examiner — Ko H Chan
(74) Attorney, Agent, or Firm — Lowe Graham Jones PLLC (57) ABSTRACT A cookware rack includes a base formed with a first beam separated from a second beam. The first and second beams include a plurality of slots arranged in a plurality of columns and a plurality of rows. A wire divider is shaped to be removably received within any one of the plurality of rows, positioned within the slots forming the desired plurality of rows.

20 Claims, 8 Drawing Sheets

COOKWARE RACK

FIELD OF THE INVENTION

This invention relates generally to racks for supporting cookware-related objects such as skillets, lids, cutting boards, and the like.

BACKGROUND OF THE INVENTION

Certain cookware items such as skillets, lids for pots, and cutting boards, can be challenging to store in a cabinet. Cutting boards can be stacked one atop the other, but removal of a board placed on the bottom can be tricky and may require removal of all of those on top. Similarly, skillets or frying pans can be stacked, but removing a lower pan from the stack can be an awkward exercise. Lids may not be stackable at all, or at least not feasibly when trying to stack more than two. Ideally such items could be stored in a horizontal position, held in place against falling over, thereby allowing for both efficient storage and easy removal. Existing devices provide insufficient structural support for heavy objects, or provide a complicated structure for reconfiguring and repositioning supporting dividers.

One example of a wire shelf having an adjustable divider is described in U.S. Pat. No. 6,460,710. This patent illustrates a moveable vertical divider which slides along horizontal wires. A center portion is included in the bent-wire divider, but the center portion stops short of the wire shelf, and provides little support as a result. Another example is illustrated in U.S. Pat. No. 4,592,471. In this case, the wire support structure includes a foot which must be inserted into a central channel, resulting in a structure which is difficult to remove and reposition. The outer edges of the wire divider are also merely resting in an open-top channel, providing less support than would be desired. A cookware rack in accordance with the present invention provides improvements over the prior art designs.

SUMMARY OF THE INVENTION

A preferred cookware rack includes a base and a number of removable wire dividers which are preferably formed from a single continuous wire. The base has an upper surface and a lower surface and is configured to be supported on a horizontal surface.

A plurality of slots is provided in the base, the plurality of slots including a plurality of exterior first beam slots arranged in a first column, a plurality of interior first beam slots arranged in a second column, a plurality of interior second beam slots arranged in a third column, and a plurality of exterior second beam slots arranged in a fourth column, the plurality of slots further being arranged in a plurality of rows perpendicular to the first, second, third, and fourth columns.

In one version, each of the plurality of rows comprises one of the plurality of exterior first beam slots, one of the plurality of interior first beam slots, one of the plurality of interior second beam slots, and one of the plurality of exterior second beam slots.

The wire dividers preferably each include a first terminal end adjacent a first arc, the first arc transitioning to a first exterior upright portion, the first exterior upright portion transitioning to a first interior upright portion, the first interior upright portion forming a first corner which transitions to a central horizontal portion, the central horizontal portion transitioning to a second corner which transitions to a second interior upright portion, the second interior upright portion transitioning to a second exterior upright portion, the second exterior upright portion terminating in a second arc which is adjacent a second terminal end.

Most preferably, each one of the plurality of wire dividers is removably positionable in a selected one of the plurality of rows of slots, such that when a first one of the wire dividers is positioned within a first one of the plurality of rows of slots, the first arc of the first one of the wire dividers is received within the exterior first beam slot of the first one of the plurality of rows of slots, the first corner of the first one of the wire dividers is received within the interior first beam slot of the first one of the plurality of rows of slots, the second corner of the first one of the wire dividers is received within the interior second beam slot of the first one of the plurality of rows of slots, and the second arc of the first one of the wire dividers is received within the exterior second beam slot of the first one of the plurality of rows of slots.

In one version, at least one of the first exterior upright or the second exterior upright is movable toward the other of the first exterior upright or the second exterior upright under application of a force, and wherein the exterior first beam slots and the exterior second beam slots are spaced apart from one another such that the force must be applied to enable insertion and removal of the first one of the plurality of wire dividers from the exterior first beam slot and the exterior second beam slot from the first one of the plurality of rows of slots.

In one example, the base further comprises a first beam and a second beam separated by a central gap, the first and second columns of slots being formed in the first beam and the third and fourth columns of slots being formed in the second beam.

Most preferably, the central gap is configured as an opening between the first beam and the second beam.

The cookware rack may also include a first end cap joining the first beam to the second beam, and an opposing second end cap joining the first beam to the second beam.

In one example, the first end cap and the second end cap each extend vertically above the upper surface of the base when the base is resting on a horizontal surface.

In one version, at least a portion first arc and at least a portion of the second arc of the first one of the wire dividers extends vertically below the central horizontal portion of the first one of the wire dividers when the first one of the wire dividers is positioned within the first one of the plurality of rows of slots.

In a version of the invention, each of the interior first beam slots comprises a vertical slot portion and a horizontal slot portion, and each of the interior second beam slots comprises a vertical slot portion and a horizontal slot portion.

In a preferred version, the first beam further comprises a first beam interior sidewall, the vertical slot portion of each of the interior first beam slots being formed on the first beam interior sidewall, the horizontal slot portion of each of the interior first beam slots being formed on the upper surface of the first beam. Similarly, the second beam further comprises a second beam interior sidewall, the vertical slot portion of each of the interior second beam slots being formed on the second beam interior sidewall, the horizontal slot portion of each of the interior second beam slots being formed on the upper surface of the second beam.

In an example, the first column is separated from the second column by a first distance, the second column is separated from the third column by a second distance, and the third column is separated from the fourth column by a third distance, the first, second, and third distances being equal to one another.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
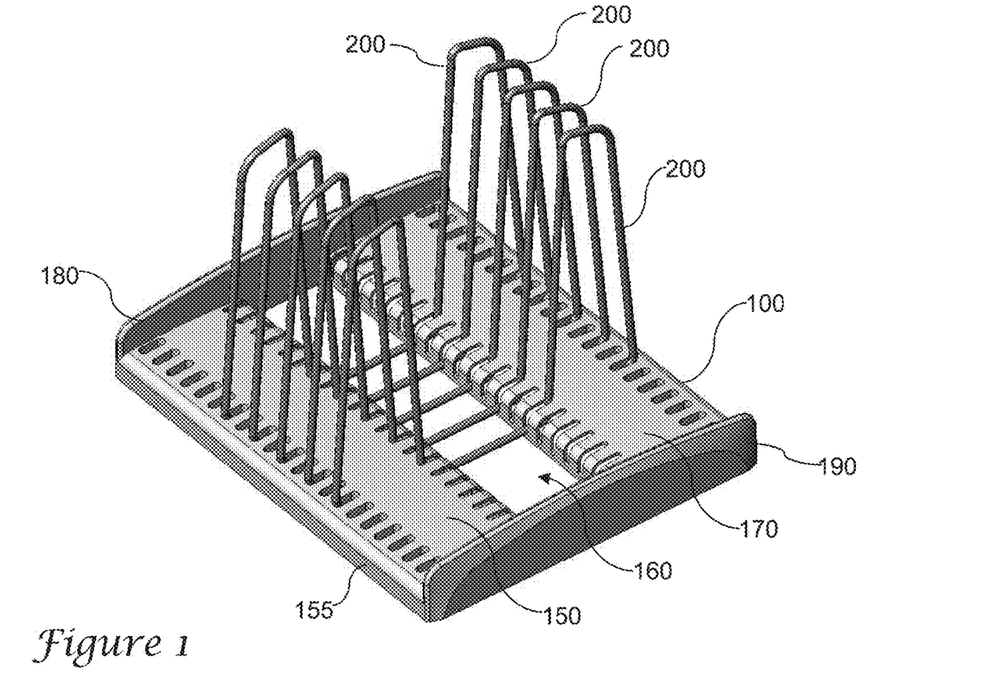
FIG. 1 is a top isometric view of a preferred cookware rack.

A preferred cookware rack is shown in an isometric view of FIG. 1 and generally includes a base 100 with a plurality of wire dividers 200. In the illustrated example of FIG. 1, a set of five dividers is shown positioned within the base, but it should be understood that any number of dividers may be used. In general, the base 100 is formed with a first support beam 150 and a second support beam 170, each of the first and second support beams being spaced apart from one another by a central gap 160. Though preferably in the form of an open area, the central region may alternatively have a surface extending between the first and second beams or be otherwise configured in different versions. The first and second support beams are joined to one another by a pair of end caps, including a first end cap 180 and a second end cap 190. In the preferred version, the first and second sides of the base are arranged with a central gap, or otherwise such that the first and second sides are somewhat raised in relation to an area at the center of the base in order to accommodate the interior slots as described below. It should be understood that the term "beam" is not limited to such discrete and separated structural cross-members, but may also comprise a raised region on an otherwise shaped base, such as a planar platform.

Figure 2:
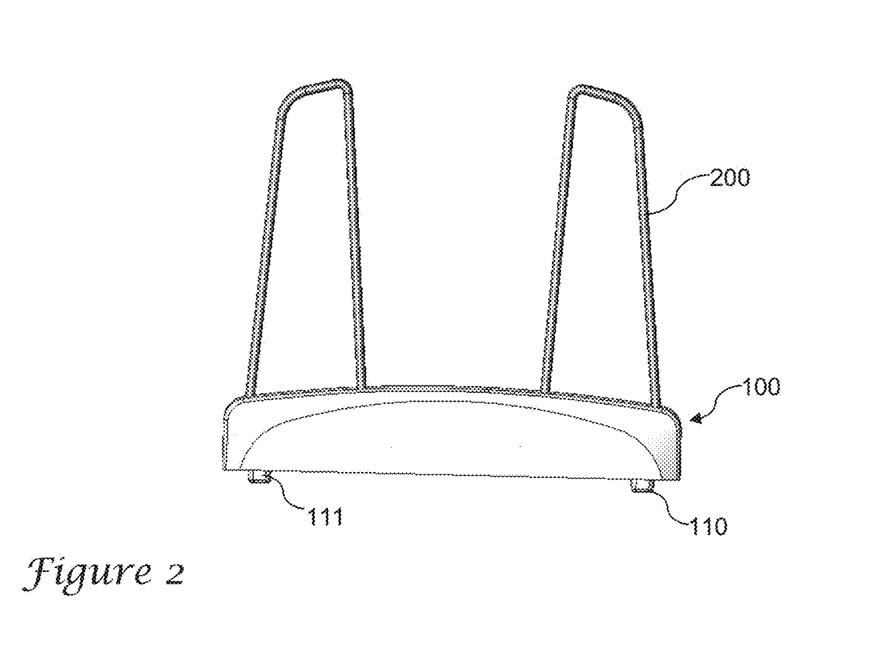
FIG. 2 is a front elevational view of a preferred cookware rack.
Figure 4:
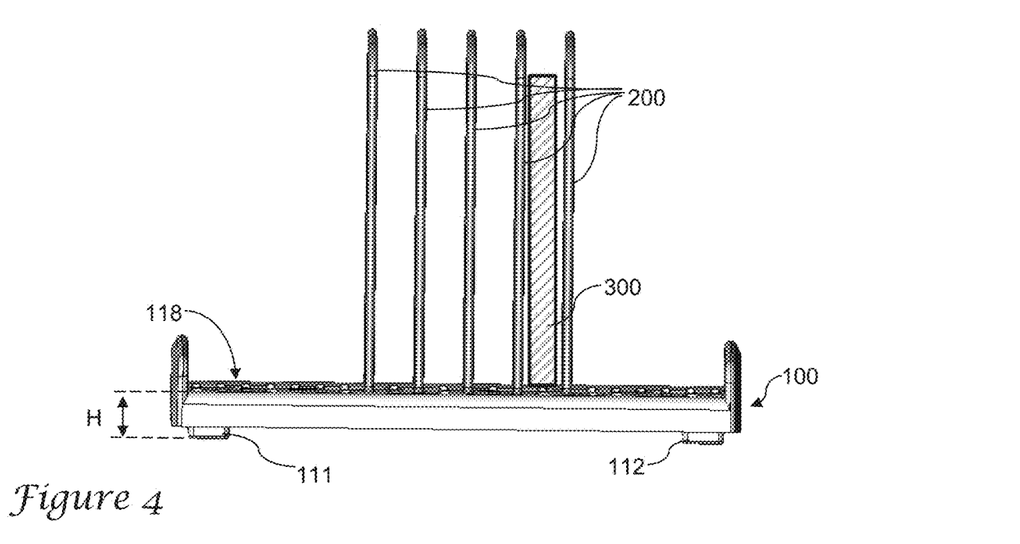
FIG. 4 is a side elevational view of a preferred cookware rack.

With reference to FIG. 2, a preferred cookware rack is shown in a front elevational view in which only the front-most wire divider 200 is visible, with other wire dividers hidden behind the front-most wire divider. As shown, the base includes a plurality of feet, including a first foot 110 and a second foot 111. In use, the platform is configured so that the feet rest on a horizontal surface (not shown), such as a shelf within a cabinet. In such a position, the base 100 will therefore also be in a generally horizontal position, with the wire dividers extending upwardly from the base in a generally vertical orientation. The side elevational view of FIG. 4 similarly shows a plurality of wire dividers 200 extending vertically above the horizontally-oriented platform 100. As seen in FIG. 4, the base is supported by feet 111 and 112. As further shown in FIG. 4, the platform includes an upper surface 118, indicated as the top surface of each of the first beam and the second beam. The feet (for example, 111, 112) and the thickness of the beams provide a height H, such that the upper surface 118 of the beams is a height H above the horizontal surface on which the feet of the cookware rack is resting.

Figure 3:
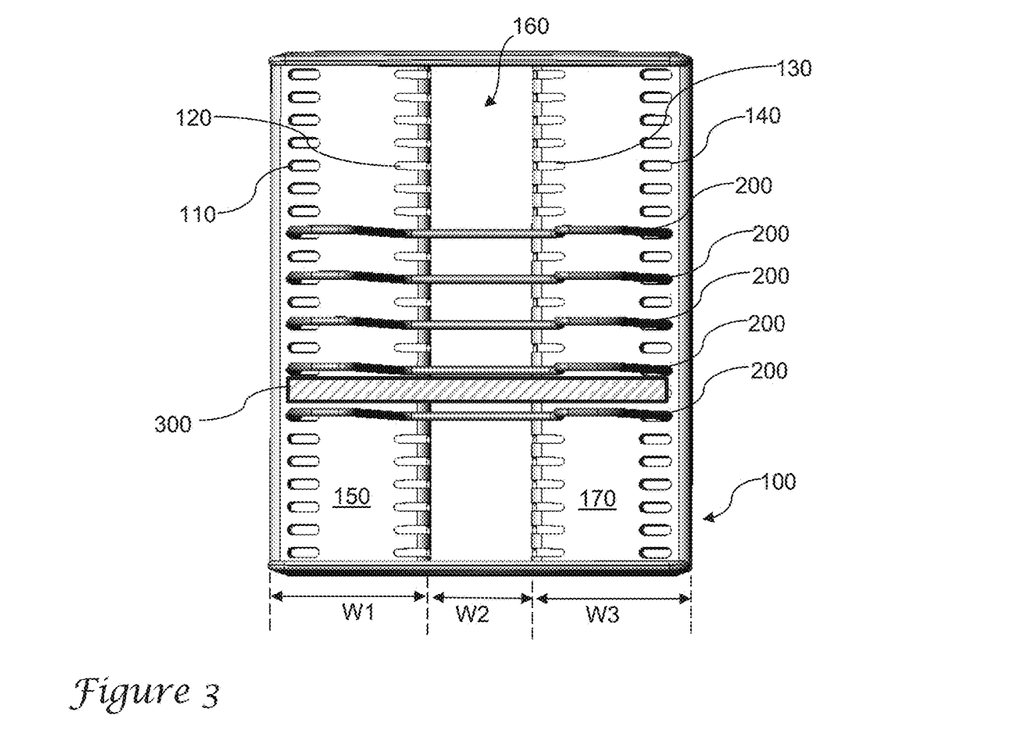
FIG. 3 is a top plan view of a preferred cookware rack.
Figure 5:
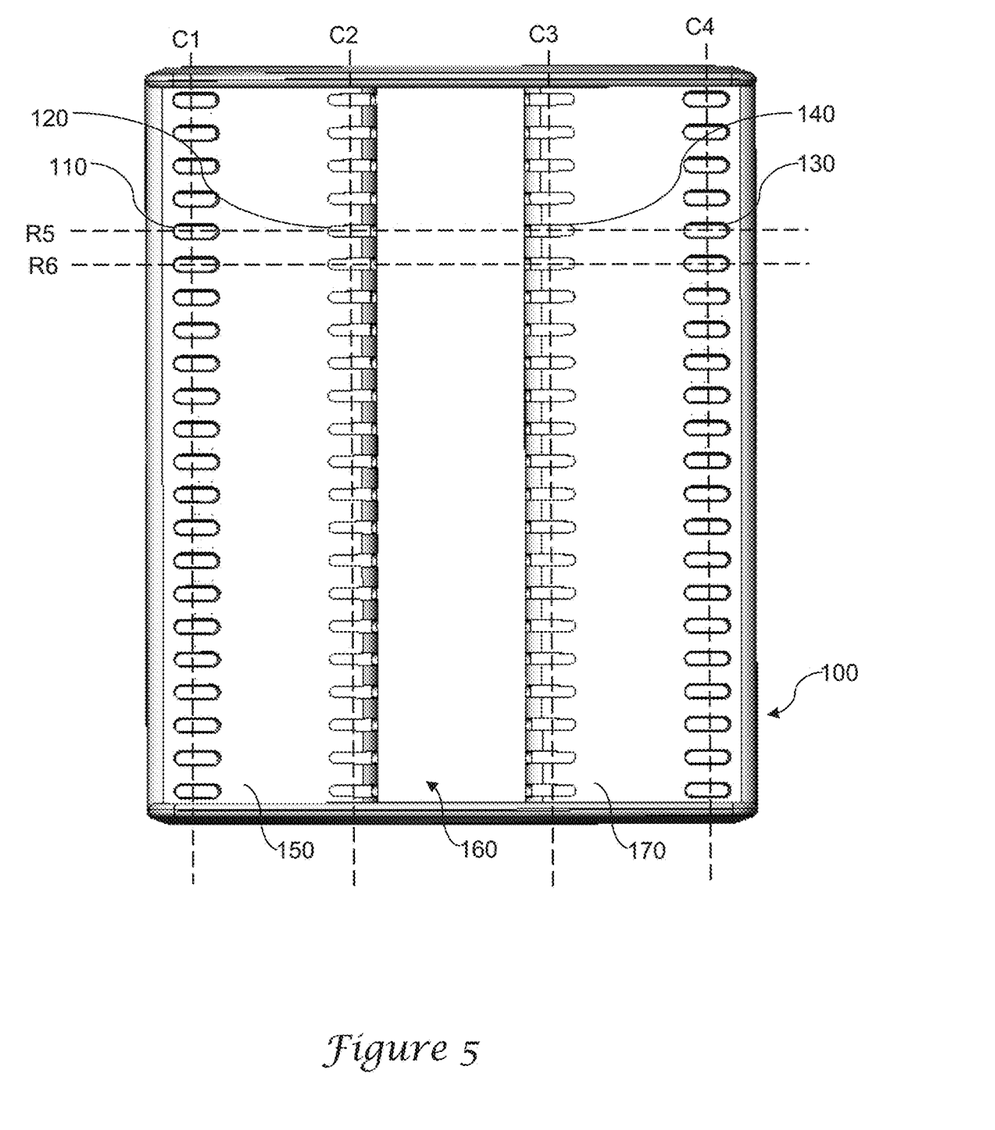
FIG. 5 is a top plan view of a base for a preferred cookware rack, without wire dividers.

FIG. 3 shows a top plan view of the preferred cookware rack, again illustrating the attachment of five removable wire dividers 200. As seen in this view, the base includes a plurality of slots arranged to allow the selective insertion and removal of the wire dividers. For example, and with further reference to FIG. 5, a single row of slots includes an exterior first beam slot 110 and an interior first beam slot 120, an interior second beam slot 130 and an exterior second beam slot 140. The slots are organized in four columns and a plurality of rows, including an exterior first beam column C1, an interior first beam column C2, an interior second beam column C3, and an exterior second beam column C4. Any number of rows may be used, in accordance with various versions of the invention, though in the illustrated example 22 rows are provided. FIG. 5 includes labels for two specific rows as examples, for the sake of clarity and simplicity, labeled as rows R5 and R6. Row R5 is the fifth row from one end of the base 100, and row R6 is the sixth row from the same end of the base, positioned adjacent the fifth row R5.

In accordance with the above organization of slots into rows and columns, the base is structured to provide a plurality of locations for the positioning of the wire dividers. More specifically, a wire divider can be positioned and attached to the base at any single row, such that the wire divider is attached to each of the four slots 110, 120, 130, 140 forming that single row of slots.

When the two or more wire dividers are in position and attached to the base, the wire dividers form interior spaces between adjacent wire dividers. The interior space is suitable for supporting a cookware item for storage in a vertical position. In the illustrated example, a cutting board 300 is shown positioned between a pair of wire dividers 200 in FIGS. 3 and 4, though it should be appreciated that any other cookware item may be stored in the illustrated position, or between any other wire dividers. Likewise, in the preferred version of the invention the first end cap 180 and second end cap 190 each extend vertically above the upper surface 118 of the first beam 150 and the second beam 170, thereby providing a support ledge for a cookware item to rest against a single wire divider on one side and against the end cap on the other side. This usage is suitable for situations in which a cookware item is leaning at least slightly toward the wire divider, such that the end cap prevents the bottom of the cookware item from sliding off of the base 100.

Most preferably the central gap 160 is an open region without any further structure. Thus, in the preferred version the first beam and the second beam are joined to one another only at the opposing end caps 180, 190, which are positioned at the opposing ends of the first beam and the second beam. As seen in FIG. 3, each of the first beam and the second beam is formed with a width, W1, W3 respectively, and most preferably the widths W1 and W3 are equal to one another. The central gap is also formed with a width W2 which separates the two beams from one another. In one version the width W1, W2 of each of the beams is greater than the width W2 of the central open area. The gap allows a portion of a curved cookware item, such as a lid, to extend into the gap and below the upper surface 118 of the platform. Accordingly, the height H is chosen to raise the upper surface 118 sufficiently above the horizontal surface (such as a shelf or countertop) so that the cookware item will not extend through the central gap and contact the horizontal surface. Most preferably, the distance between each of columns of slots C1, C2, C3, C4 is the same, so that the columns are evenly spaced along the width of the base, thereby providing consistent strength and rigidity of the wire dividers when attached.

Figure 6:
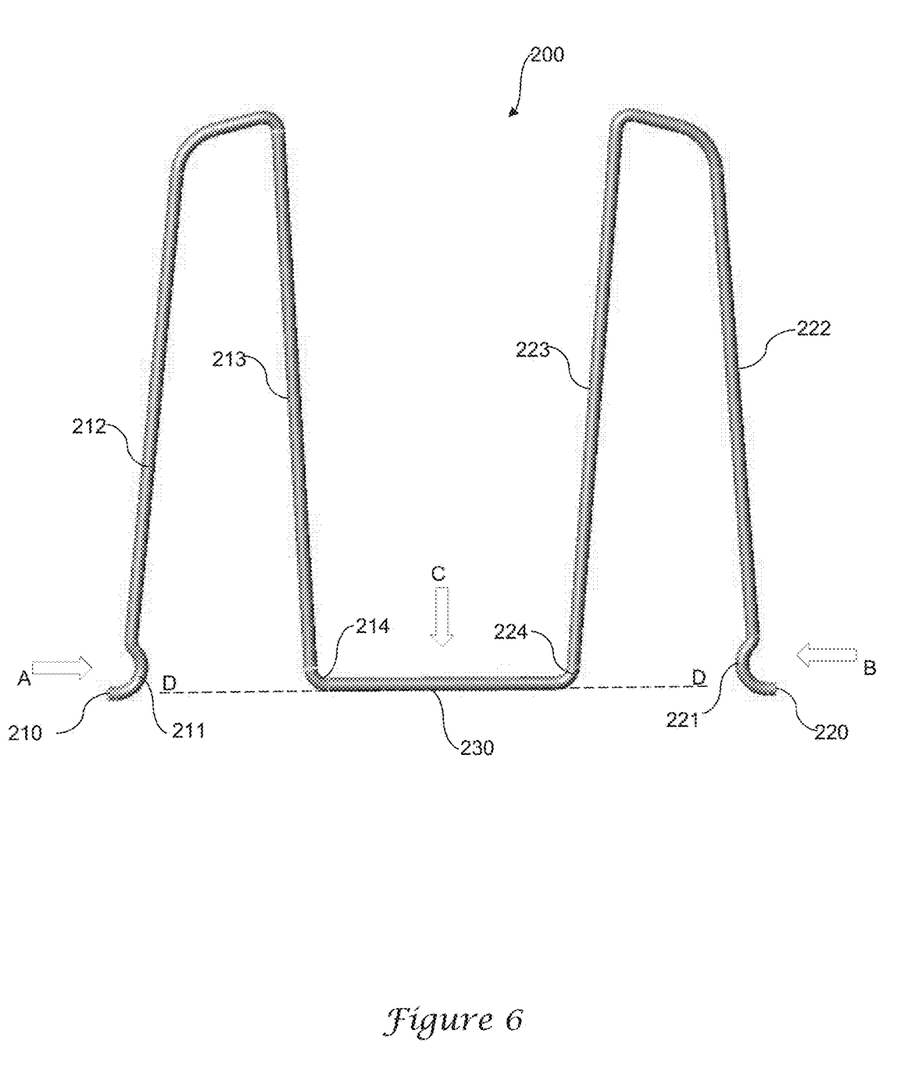
FIG. 6 is a front view of a preferred wire divider for use with a preferred cookware rack.

FIG. 6 shows a front view of a preferred wire 200 to be used as a wire divider. As shown, the wire divider is formed from a single continuous wire material of sufficient thickness to retain structural rigidity but while allowing opposing ends of the wire to flex inward and outward for attachment and removal. In addition, most preferably the wire forms a divider which is bent into the shape as shown, but which is otherwise planar in side view (such as shown in FIG. 4). The wire 200 includes a first terminal end 210 and an opposing second terminal end 220. Adjacent the first terminal end, the wire is curved to form a first arc 211 which is nearly semi-circular, having its open end of the semicircle facing outwardly, away from the interior of the wire divider (with the interior being defined as the space between uprights 213, 223). From the first arc 211, the wire then extends along a first exterior upright section 212, which reverses course and becomes a first interior upright portion 213. The first interior upright portion returns vertically and transitions at a first corner 214 to a central support section 230, which in the illustrated example extends horizontally along an axis D-D. The wire then continues as the central support section transitions at a second corner 224 to a second interior upright portion 223, which reverses course and becomes a second exterior upright portion 222. The second exterior upright portion extends vertically toward the axis D-D, transitioning to a second arc 221, which terminates in the second terminal end 220.

As shown in FIG. 6, preferably the first and second terminal ends 210, 220 extend below the axis D-D, with "below" being defined in the direction of the arrow C in FIG. 6, and which will also be physically below the central support section 230 when the wire divider 200 is in position within the base 100. In addition, the axis D-D extends through each of the first and second arcs 211, 221. As described further below, the wire divider is inserted by pushing it in the direction of the arrow C toward the upper surface of the base, while squeezing the first and second exterior upright portions 212, 222 toward one another, in the directions as indicated by arrows A and B.

Figure 7:
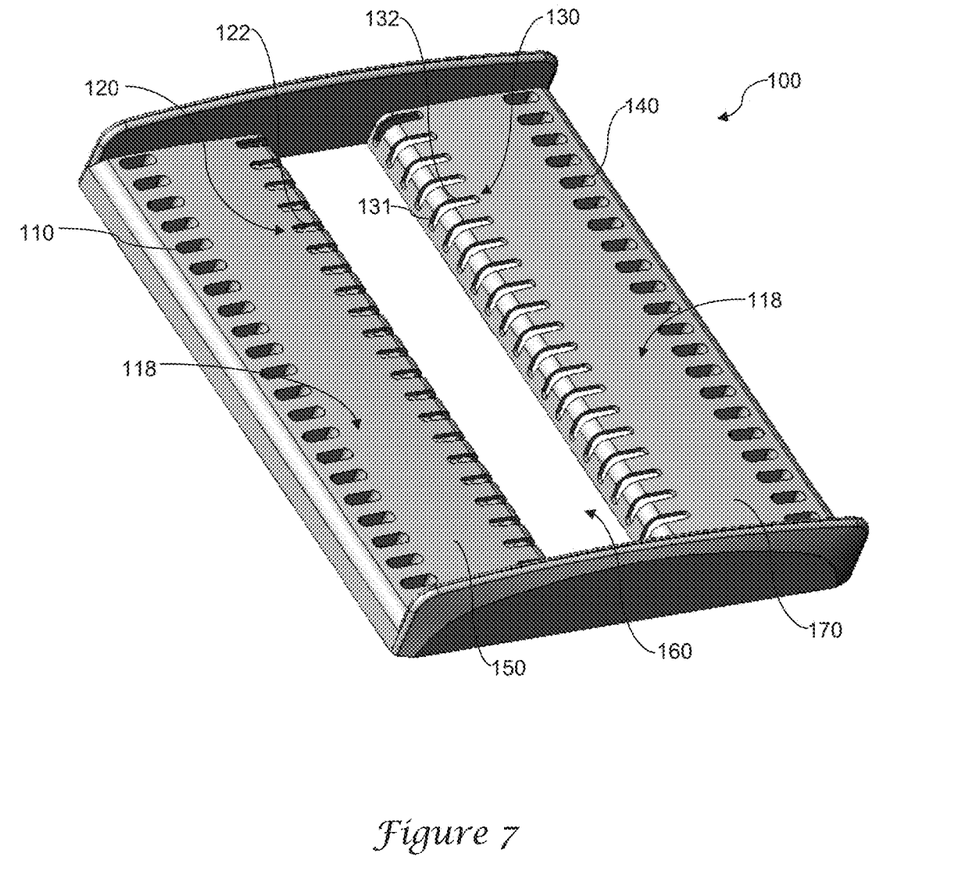
FIG. 7 is an isometric view of a base for a preferred cookware rack, without wire dividers.

The base 100 is shown in FIG. 7 without any attached wire dividers, thereby showing the slot configuration more clearly. As described above, each row of slots includes four slots 110, 120, 130, 140. Each of the interior beam slots includes a vertical portion and a horizontal portion. Thus, in FIG. 7 the interior second beam slots 130 are most clearly visible, formed on the second beam 170. As indicated, the interior second beam slots include a vertical slot portion 131 and a horizontal slot portion 132. Preferably, each of the interior second beam slots 130 is formed with the same shape. Likewise, in the preferred version each of the interior first beam slots 120 is a mirror image of a corresponding interior second beam slot, so that each includes a vertical slot portion 121 and a horizontal slot portion 122 (see FIGS. 7 and 8).

The first beam includes an external sidewall 155 and an internal sidewall 161, while the second beam likewise includes an external sidewall 175 and an internal sidewall 162. The vertical portion 131 of the interior second beam slots 130 are formed on the second beam internal sidewall 162. Similarly, the vertical portion 121 of the interior first beam slots 120 are formed on the first beam internal sidewall 161, as best seen in FIG. 8.

Figure 8:
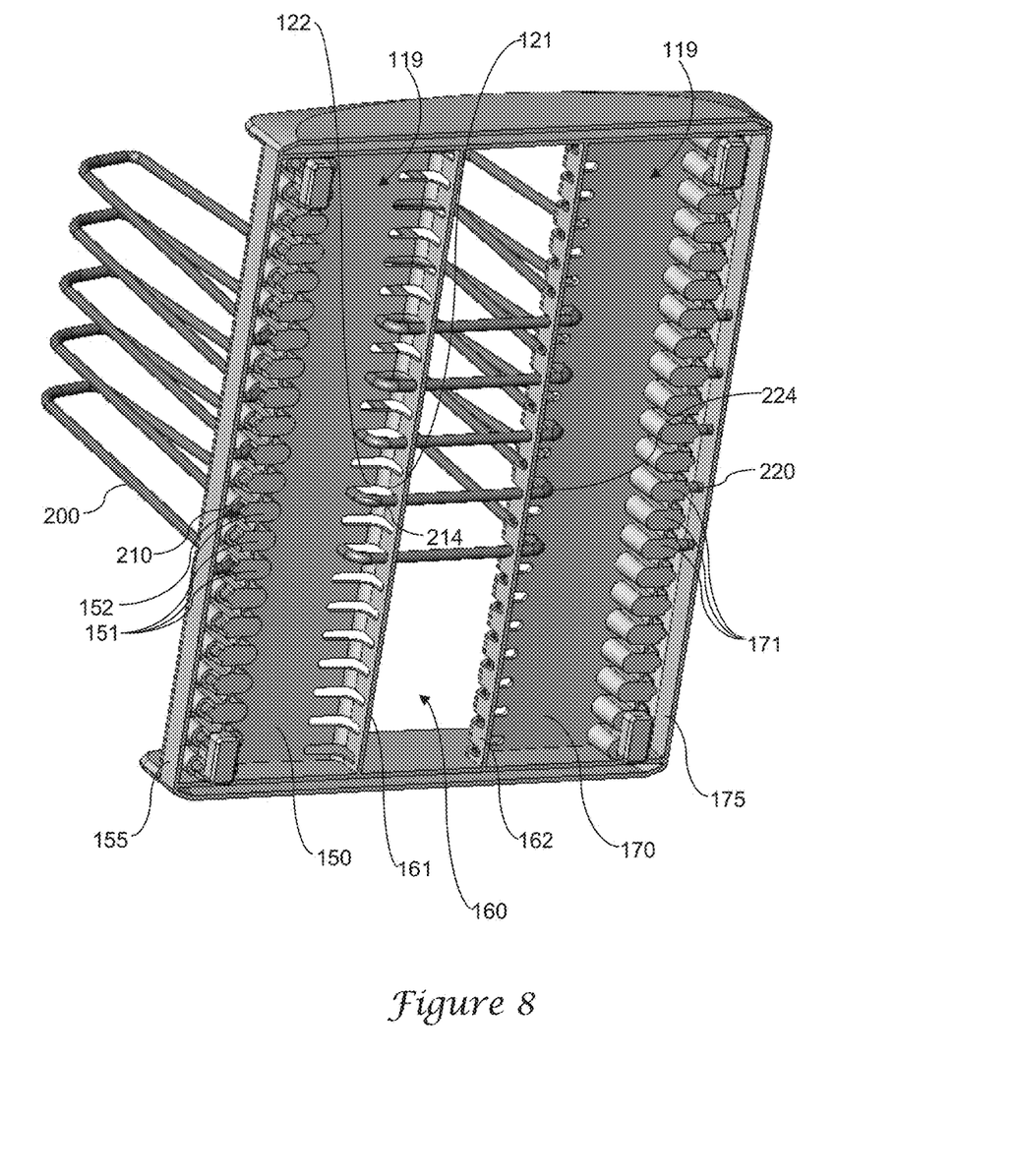
FIG. 8 is a bottom isometric view of a preferred cookware rack.

FIG. 8 shows a bottom isometric view of the preferred cookware rack, and in particular the attachment of the wires 200. The combined vertical and horizontal slots are shaped to receive corresponding corners 214, 224, shown in FIG. 8 extending into the base, so that both a vertical and a horizontal portion of the wire 200 is received within the interior beam slots 120, 130. Thus, the first corner 214 extends into the first interior beam slot 120 of the first beam 150 and is seated so that the horizontal portion 230 rests below the upper surface of the base. Likewise, the second corner 224 extends into the second interior beam slot of the second beam 170 and below the upper surface 118 of the base. The interaction of the corners of the wires with both the vertical and horizontal edges forming the slots serves to provide enhanced rigidity to the wire divider when inserted into the base.

The lower portion of the base further includes a plurality of supports, e.g. 151, formed on the lower surface 119 of the first beam 150, and a corresponding plurality of supports, e.g. 171, formed on the lower surface 119 of the second beam 170. The supports provide structural support for receiving and retaining the terminal ends 210, 220 of the wires 200. Each of the exterior first beam slots 110 extends downward from the upper surface 118 and into a corresponding support 151, in which the slot forms an interior channel that ends with an opening 152 formed in the support. Accordingly, as seen in FIG. 8, a first terminal end 210 of a wire divider 200 extends into a first beam slot 110 and may extend outward through the opening 152 in the support 151. In other versions, the supports may be sized and configured to fully retain the terminal ends of the wires. The supports 171 of the second beam 170 are configured in a mirror image of the supports in the first beam, so that the exterior second beam slots 140 extend into the supports 171 and form channels which end with an opening in the supports. The second terminal end 220 of the wires may extend through the opening, as with the first terminal end as described above.

Figure 9:
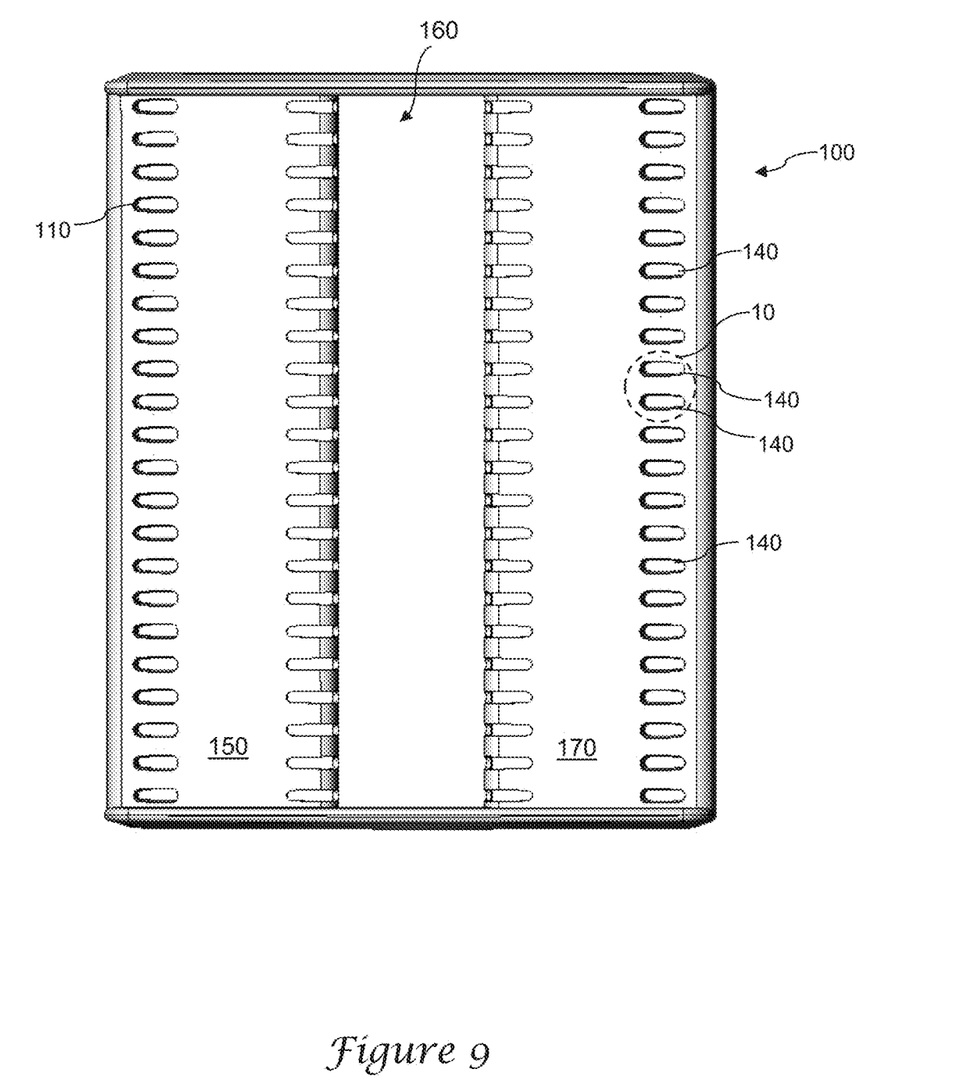
FIG. 9 is a top plan view of an alternate preferred cookware rack.
Figure 10:
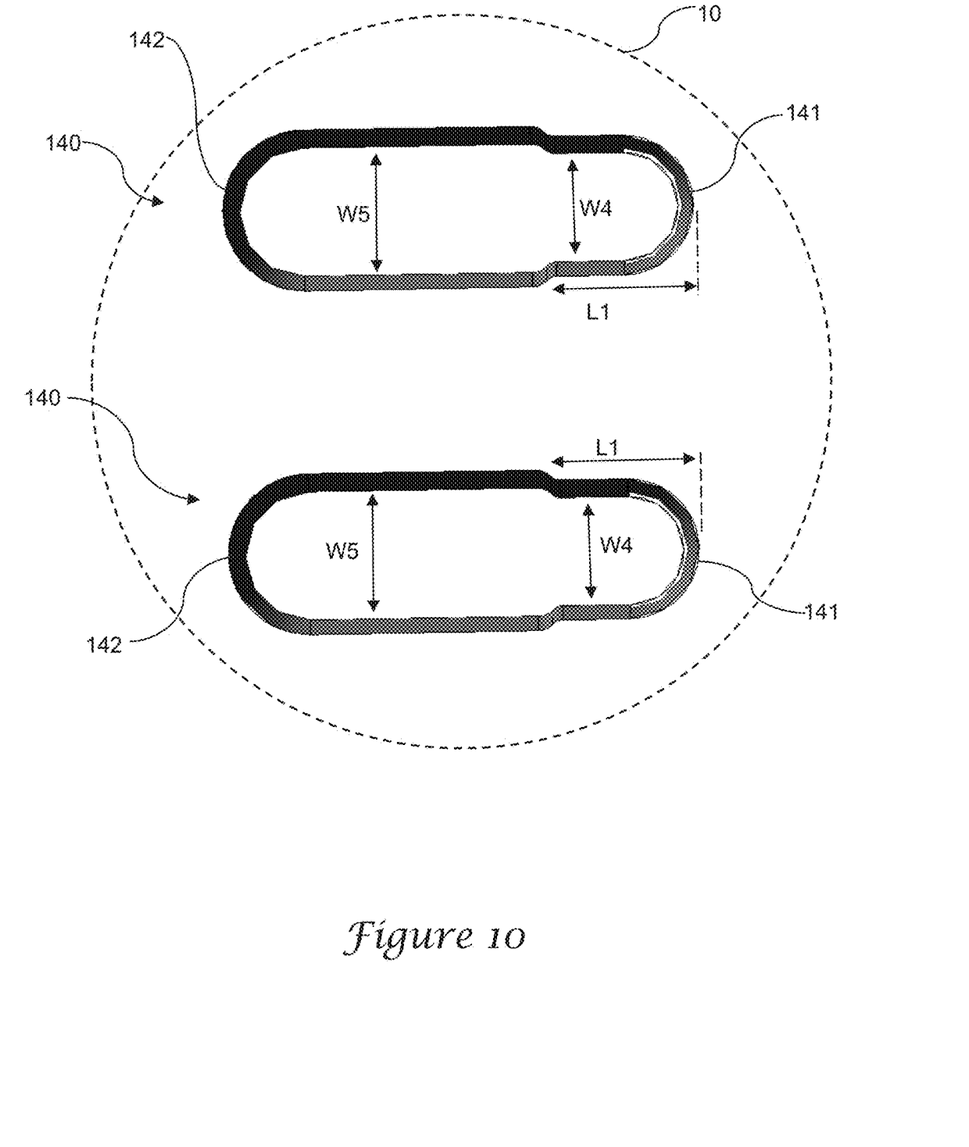
FIG. 10 is a close-up view of detail 10 from FIG. 9.

With reference to FIG. 9, the exterior first beam slots 110 and the exterior second beam slots 140 may be configured in a shape which is narrower at the peripheral ends (toward the outer edges of the base) than at the interior ends (toward the middle, or the open space 160). A close up view of the region indicated as detail 10 is shown in FIG. 10, illustrating two representative exterior second beam slots 140. It should be appreciated that the exterior first beam slots 100 in FIG. 9 are a mirror-image of the exterior second beam slots 140.

As best seen in FIG. 10, each of the exterior second beam slots 140 includes an outer end 141 and an inner end 142. The exterior second beam slots 140 further have a width between the outer end and the inner end, and in the illustrated example there are two separate widths, including a narrower width W4 at the outer end 141 and a wider width W5 at the inner end 142. Most preferably, the width W4 at the outer end 141 is slightly less than or equal to the diameter of the wires 200, so that a wire positioned at the outer end of the slot will be wedged in place and frictionally held in position. In one example, the narrower width W4 at the outer end extends along the slot for a distance L1, which preferably is slightly greater than the diameter of the wires 200. The inner end 142 of the slot 140 has a width W5 which is much greater than the diameter of the wire, so that the wire may be easily inserted and removed from the inner end of the slot, but not easily removed from the outer end of the slot.

In the preferred version of the invention, the exterior first beam slots 110 are formed in a mirror image, thereby having an inner end (that is, the end closer to the central gap 160) and an outer end (that is, the end closer to the outer edge of the base, away from the central gap), and further in which the inner end is wider than the outer end in the same manner as described above for the exterior second beam slots 140.

In use, one or more wire dividers 200 is positioned above the base while urging the opposing sides of the wire dividers inward, as described above. The divider is then pressed downward and the pressure released in order to seat the wire divider within the base, and below the upper surface of the base. Once a desired number of wire dividers are mounted where desired, cookware such as cutting boards, lids, or pots may be positioned on the rack, and preferably between adjacent wire dividers, for support and storage.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A cookware rack, comprising:
    a base having an upper surface and a lower surface and configured to be supported on a horizontal surface;
    a plurality of slots provided in the base, the plurality of slots including a plurality of exterior first beam slots arranged in a first column, a plurality of interior first beam slots arranged in a second column, a plurality of interior second beam slots arranged in a third column, and a plurality of exterior second beam slots arranged in a fourth column, the plurality of slots further being arranged in a plurality of rows perpendicular to the first, second, third, and fourth columns;
    wherein each of the plurality of rows comprises one of the plurality of exterior first beam slots, one of the plurality of interior first beam slots, one of the plurality of interior second beam slots, and one of the plurality of exterior second beam slots; and
    a plurality of wire dividers, each of the wire dividers having a first terminal end adjacent a first arc, the first arc transitioning to a first exterior upright portion, the first exterior upright portion transitioning to a first interior upright portion, the first interior upright portion forming a first corner which transitions to a central horizontal portion, the central horizontal portion transitioning to a second corner which transitions to a second interior upright portion, the second interior upright portion transitioning to a second exterior upright portion, the second exterior upright portion terminating in a second arc which is adjacent a second terminal end;
    wherein each one of the plurality of wire dividers is removably positionable in a selected one of the plurality of rows of slots, such that when a first one of the wire dividers is positioned within a first one of the plurality of rows of slots:
        the first arc of the first one of the wire dividers is received within the exterior first beam slot of the first one of the plurality of rows of slots;
        the first corner of the first one of the wire dividers is received within the interior first beam slot of the first one of the plurality of rows of slots;
        the second corner of the first one of the wire dividers is received within the interior second beam slot of the first one of the plurality of rows of slots; and
        the second arc of the first one of the wire dividers is received within the exterior second beam slot of the first one of the plurality of rows of slots;
    further wherein at least one of the first exterior upright portion or the second exterior upright portion is movable toward the other of the first exterior upright portion or the second exterior upright portion under application of a force, and wherein the exterior first beam slots and the exterior second beam slots are spaced apart from one another such that the force must be applied to enable insertion and removal of the first one of the plurality of wire dividers from the exterior first beam slot and the exterior second beam slot from the first one of the plurality of rows of slots.

2. The cookware rack of claim 1, wherein the base further comprises a first beam and a second beam separated by a central gap, the first and second columns of slots being formed in the first beam and the third and fourth columns of slots being formed in the second beam.

3. The cookware rack of claim 2, wherein the central gap is configured as an opening between the first beam and the second beam.

4. The cookware rack of claim 2, further comprising a first end cap joining the first beam to the second beam, and an opposing second end cap joining the first beam to the second beam.

5. The cookware rack of claim 4, wherein the first end cap and the second end cap each extend vertically above the upper surface of the base when the base is resting on a horizontal surface.

6. The cookware rack of claim 5, wherein at least a portion first arc and at least a portion of the second arc of the first one of the wire dividers extends vertically below the central horizontal portion of the first one of the wire dividers when the first one of the wire dividers is positioned within the first one of the plurality of rows of slots.

7. The cookware rack of claim 5, further wherein:
    each of the interior first beam slots comprises a vertical slot portion and a horizontal slot portion; and
    each of the interior second beam slots comprises a vertical slot portion and a horizontal slot portion.

8. The cookware rack of claim 7, further wherein:
    the first beam further comprises a first beam interior sidewall, the vertical slot portion of each of the interior first beam slots being formed on the first beam interior sidewall, the horizontal slot portion of each of the interior first beam slots being formed on the upper surface of the first beam; and
    the second beam further comprises a second beam interior sidewall, the vertical slot portion of each of the interior second beam slots being formed on the second beam interior sidewall, the horizontal slot portion of each of the interior second beam slots being formed on the upper surface of the second beam.

9. The cookware rack of claim 8, wherein the first column is separated from the second column by a first distance, the second column is separated from the third column by a second distance, and the third column is separated from the fourth column by a third distance, the first, second, and third distances being equal to one another.

10. A cookware rack, comprising:
a base formed by a first beam spaced apart from a second beam, the base having an upper surface and a lower surface, the first beam having an interior first beam sidewall and the second beam having an interior second beam sidewall facing toward the interior first beam sidewall, the base further being configured to be supported on a horizontal surface, wherein the first beam sidewall extends upwardly toward the upper surface and the second beam sidewall extends upwardly toward the upper surface when the base is resting on the horizontal surface, the base further having a first end cap joining the first beam to the second beam, and an opposing second end cap joining the first beam to the second beam;
a plurality of slots provided in the base and formed in a first row, the plurality of slots including:
an exterior first beam slot and an interior first beam slot positioned on the first beam;
an interior second beam slot and an exterior second beam slot positioned on the second beam;
wherein the interior first beam slot includes a vertical portion formed on the interior first beam sidewall and a horizontal portion formed on the upper surface; and
further wherein the interior second beam slot includes a vertical portion formed on the interior second beam sidewall and a horizontal portion formed on the upper surface;
a wire divider having:
a first terminal end adjacent a first arc;
the first arc transitioning to a first exterior upright portion;
the first exterior upright portion transitioning to a first interior upright portion;
the first interior upright portion forming a first corner which transitions to a central horizontal portion;
the central horizontal portion transitioning to a second corner;
the second corner transitioning to a second interior upright portion;
the second interior upright portion transitioning to a second exterior upright portion;
the second exterior upright portion terminating in a second arc;
the second arc being adjacent a second terminal end;
wherein the wire divider is removably positionable in the plurality of slots, such that when the wire divider is positioned within the plurality of slots:
the first arc is received within the exterior first beam slot;
the first corner is received within the interior first beam slot;
the second corner is received within the interior second beam slot; and
the second arc is received within the exterior second beam slot.

11. The cookware rack of claim 10, further comprising a central gap, the central gap being configured as an opening between the first beam and the second beam.

12. The cookware rack of claim 11, wherein the first end cap and the second end cap each extend vertically above the upper surface of the base when the base is resting on the horizontal surface.

13. The cookware rack of claim 12, wherein the exterior first beam slot is separated from the interior first beam slot by a first distance, the interior first beam slot is separated from the interior second beam slot by a second distance, and the interior second beam slot is separated from the exterior second beam slot by a third distance, the first, second, and third distances being equal to one another.

14. The cookware rack of claim 13, further comprising an additional plurality of slots formed as an additional plurality of rows, the plurality of slots and the additional plurality of slots being arranged in a plurality of columns, including a first column of exterior first beam slots, a second column of interior first beam slots, a third column of interior second beam slots, and a fourth column of exterior second beam slots.

15. The cookware rack of claim 14, wherein the first exterior upright portion is movable toward the second exterior upright portion under application of a force to facilitate insertion and removal of the wire divider.

16. The cookware rack of claim 15, wherein the wire divider comprises a plurality of wire dividers.

17. The cookware rack of claim 10, wherein:
the exterior first beam slot further comprises an inner end and an outer end, the outer end being positioned toward the outer edge of the base;
the exterior second beam slot further comprises an inner end and an outer end, the outer end being positioned toward the outer edge of the base; and
further wherein the inner end of each of the exterior first beam slot and the exterior second beam slot comprises a first slot width, and the outer end of each of the exterior first beam slot and the exterior second beam slot comprises a second slot width, the second slot width being greater than the first slot width.

18. A cookware rack, comprising:
a base having an upper surface and a lower surface and being configured to be supported on a horizontal surface, the upper surface having a first side and a second side, each of the first side and the second side extending between a first end and a second end;
a plurality of slots provided in the base and formed in a plurality of rows, each of the plurality of rows including, in order from the first side to the second side, an exterior first side slot, an interior first side slot, an interior second side slot, and an exterior second side slot;
wherein the interior first side slot includes a vertical portion formed on an interior first side sidewall and a horizontal portion formed on the upper surface; and
wherein the interior second side slot includes a vertical portion formed on an interior second side sidewall and a horizontal portion formed on the upper surface;
wherein the exterior first side slot includes an inner end and an outer end, the inner end being adjacent the interior first side slot, the inner end having a width which is wider than a width of the outer end; and
wherein the exterior second side slot includes an inner end and an outer end, the inner end being adjacent the interior second side slot, the inner end having a width which is wider than a width of the outer end; and
a wire divider removably supportable by one of the plurality of rows in the base, wherein when the wire divider is supported by a selected one of the plurality of rows, a portion of the wire divider is received within each of the exterior first side slot, the interior first side slot, the interior second side slot, and the exterior second side slot forming the selected one of the plurality of rows.

19. The cookware rack of claim 18, wherein:
the wire divider comprises:
- a first terminal end adjacent a first arc;
- the first arc transitioning to a first exterior upright portion;
- the first exterior upright portion transitioning to a first interior upright portion;
- the first interior upright portion forming a first corner which transitions to a central horizontal portion;
- the central horizontal portion transitioning to a second corner;
- the second corner transitioning to a second interior upright portion;
- the second interior upright portion transitioning to a second exterior upright portion;
- the second exterior upright portion terminating in a second arc; and
- the second arc being adjacent a second terminal end; and further wherein when the wire divider is removably supported in the selected one of the plurality of rows:
- the first arc is received within the exterior first side slot;
- the first corner is received within the interior first side slot;
- the second corner is received within the interior second side slot; and
- the second arc is received within the exterior second side slot.

20. The cookware rack of claim 18, further comprising a central gap, the central gap being configured as an opening between the first side and the second side.

* * * * *